(12) United States Patent
Weis et al.

(10) Patent No.: US 12,173,178 B2
(45) Date of Patent: Dec. 24, 2024

(54) POLYFUNCTIONAL HYDRAZIDE CROSSLINKER

(71) Applicant: PPG Industries Ohio, Inc., Cleveland, OH (US)

(72) Inventors: Jonathan Garrett Weis, Allison Park, PA (US); Gereme Hensel, Cranberry Township, PA (US); Chad Alan Landis, Oakmont, PA (US); Pedro Velez-Herrera, Pittsburgh, PA (US); Maria Wang, Allison Park, PA (US); Shanti Swarup, Allison Park, PA (US); Tsukasa Mizuhara, Seven Valleys, PA (US); Xiangling Xu, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/256,429

(22) PCT Filed: Dec. 10, 2021

(86) PCT No.: PCT/US2021/062763
§ 371 (c)(1),
(2) Date: Jun. 8, 2023

(87) PCT Pub. No.: WO2022/125866
PCT Pub. Date: Jun. 16, 2022

(65) Prior Publication Data
US 2024/0117215 A1  Apr. 11, 2024

Related U.S. Application Data

(60) Provisional application No. 63/123,607, filed on Dec. 10, 2020.

(51) Int. Cl.
| | | |
|---|---|---|
| *C09D 175/06* | (2006.01) | |
| *C08G 18/10* | (2006.01) | |
| *C08G 18/30* | (2006.01) | |
| *C08G 18/32* | (2006.01) | |
| *C08G 18/34* | (2006.01) | |
| *C09D 175/08* | (2006.01) | |

(52) U.S. Cl.
CPC ........... *C09D 175/06* (2013.01); *C08G 18/10* (2013.01); *C08G 18/302* (2013.01); *C08G 18/3231* (2013.01); *C08G 18/348* (2013.01); *C09D 175/08* (2013.01); *C08G 2150/00* (2013.01)

(58) Field of Classification Search
CPC .......................... C09D 175/06; C09D 175/04; C08G 18/3231; C08G 18/348
See application file for complete search history.

(56) References Cited

U.S. PATENT DOCUMENTS

| | | | | |
|---|---|---|---|---|
| 3,912,680 | A | * | 10/1975 | Oretel et al. ........... C08G 18/75 260/29.2 |
| 4,543,144 | A | * | 9/1985 | Thoma ..................... D06N 3/14 524/839 |
| 5,147,926 | A | * | 9/1992 | Meichsner ........... C09D 11/102 524/839 |
| 7,872,078 | B2 | | 1/2011 | Foringer |
| 9,120,916 | B1 | | 9/2015 | Swarup |
| 11,198,153 | B2 | | 12/2021 | Xu |
| 2007/0244258 | A1 | | 10/2007 | Swarup |
| 2011/0008628 | A1 | | 1/2011 | Fujita et al. |
| 2015/0004420 | A1 | | 1/2015 | Hill et al. |
| 2015/0307738 | A1 | | 10/2015 | Schmucker et al. |
| 2016/0160078 | A1 | | 6/2016 | Edwards |
| 2023/0033514 | A1 | * | 2/2023 | Wang ..................... C08G 18/12 |

FOREIGN PATENT DOCUMENTS

| | | | |
|---|---|---|---|
| CN | 105175642 A | | 12/2015 |
| EP | 0646609 A1 | | 4/1995 |
| EP | 1454971 B1 | | 2/2006 |
| EP | 1851259 B1 | | 4/2018 |
| GB | 1055304 A | * 1/1967 | ............. C08G 18/10 |
| JP | 06329744 A | * 11/1994 | |
| JP | H10139839 A | | 5/1998 |
| WO | 2015/030955 A1 | | 3/2015 |

OTHER PUBLICATIONS

JP-06329744-A_Nov. 1994_English Translation.*
International Search Report and Written Opinion received for PCT Application Serial No. PCT/US2021/062763 dated Apr. 12, 2022, 11 pages.

* cited by examiner

Primary Examiner — Michael L Leonard

(57) ABSTRACT

A crosslinker composition is prepared from a reaction mixture including: (a) a prepolymer including a reaction product of a prepolymer mixture including: (i) a polyfunctional isocyanate; and (ii) a first compound comprising two or more active hydrogen groups, where the polyfunctional isocyanate and/or the first compound comprising two or more active hydrogen groups includes a greater than two functional isocyanate and/or active hydrogen groups, respectively; and (b) a polyfunctional hydrazide. The crosslinker composition is not self-crosslinkable. The crosslinker composition has an acid value of at least 15 based on total resin solids of the crosslinker composition.

22 Claims, No Drawings

POLYFUNCTIONAL HYDRAZIDE CROSSLINKER

CROSS-REFERENCE TO RELATED APPLICATIONS

This present application is a U.S. national stage filing under 35 U.S.C. § 371 of International Application No. PCT/US2021/062763, filed on Dec. 10, 2021, which claims the benefit under 35 U.S.C. § 119 (e) of prior U.S. Provisional Application Ser. No. 63/123,607, filed Dec. 10, 2020, under 35 U.S.C. 119, titled "POLYFUNCTIONAL HYDRAZIDE CROSSLINKER" which is incorporated herein by reference.

FIELD OF THE INVENTION

The present invention relates to crosslinker compositions and coating compositions prepared from the crosslinker compositions.

BACKGROUND OF THE INVENTION

Coatings are applied to numerous substrates to provide protective and/or decorative qualities. These coatings often cure upon reaction of a functional resin with a crosslinker. It is desirable to produce a crosslinker from a crosslinker composition that includes a polyfunctional hydrazide to improve crosslinking, adhesion, stain resistance, and/or durability.

SUMMARY OF THE INVENTION

The present invention is directed to a crosslinker composition prepared from a reaction mixture including: (a) a prepolymer including a reaction product of a prepolymer mixture including: (i) a polyfunctional isocyanate; and (ii) a first compound comprising two or more active hydrogen groups, where the polyfunctional isocyanate and/or the first compound comprising two or more active hydrogen groups includes a greater than two functional isocyanate and/or active hydrogen groups, respectively; and (b) a polyfunctional hydrazide. The crosslinker composition is not self-crosslinkable. The crosslinker composition has an acid value of at least 15 based on total resin solids of the crosslinker composition.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses the singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" crosslinker, "an" acid, "an" isocyanate, and the like refer to one or more of any of these items.

As used herein, a "film-forming resin" refers to a resin forming a self-supporting continuous film on at least a horizontal surface of a substrate upon removal of any diluents or carriers present in the composition or upon curing. Also, as used herein, the term "polymer" is meant to refer to prepolymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The present invention is directed to a crosslinker composition prepared from a reaction mixture, comprising: (a) a prepolymer comprising a reaction product of a prepolymer mixture comprising: (i) a polyfunctional isocyanate; and (ii) a first compound comprising two or more active hydrogen groups, wherein the polyfunctional isocyanate and/or the first compound comprising two or more active hydrogen groups comprises a greater than two functional isocyanate and/or active hydrogen groups, respectively; and (b) a polyfunctional hydrazide, wherein the crosslinker composition is not self-crosslinkable, wherein the crosslinker composition has an acid value of at least 15 based on total resin solids of the crosslinker composition.

The crosslinker composition is prepared from a reaction mixture that comprises a prepolymer. As used herein, a "prepolymer" refers to a polymer precursor capable of further reactions or polymerization by one or more reactive groups to form a higher molecular mass or cross-linked state. The prepolymer comprises a reaction product of a prepolymer mixture.

The prepolymer mixture comprises a polyfunctional isocyanate and a first compound comprising two or more active hydrogen groups. As used herein, the term "active hydrogen groups" refers to functional groups that are reactive with isocyanate. As used herein, a "polyfunctional" isocyanate refers to a compound that includes two or more isocyanate (—NCO) groups. As used herein, a "compound comprising two or more active hydrogen groups" refers to a compound that comprises two or more active hydrogen groups. Non-limiting examples of active hydrogen groups include hydroxyl and/or amine and/or thiol groups. The amine groups may comprise primary and/or secondary amines. The polyfunctional isocyanate and/or the first compound comprising two or more active hydrogen groups comprises a greater than two functional isocyanate and/or active hydrogen groups, respectively.

Functionality as reported herein refers to average functionality which may be theoretically determined, such as by number average molecular weight divided by equivalent weight.

The prepolymer mixture comprises a polyfunctional isocyanate. The polyfunctional isocyanate may comprise a diisocyanate. The polyfunctional isocyanate may comprise greater than two isocyanate functional groups. The polyfunctional isocyanate may comprise a mixture of a diisocyanate and a polyfunctional isocyanate comprising greater than two isocyanate functional groups.

Non-limiting examples of suitable difunctional isocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, xylylene diisocyanate (XDI), and/or mixtures or combinations thereof.

Non-limiting examples of suitable polyfunctional isocyanates comprising greater than two isocyanate functional groups include 1,2,4-benzene triisocyanate, 1,6,11-undecanetriisocyanate, 1,3,6-hexamethylene triisocyanate, lysinetriisocyanate methyl ester, mesitylene triisocyanate, trimethylbenzene triisocyanate, benzene triisocyanate, triphenylmethane triisocyanate, naphthalene triisocyanate, diphenylmethane-2,4,4'-triisocyanate, and/or mixtures or combinations thereof.

The polyfunctional isocyanate may comprise polyisocyanate linkages, such as uretdiones, biurets, allophanates, and/or isocyanurates. Non-limiting examples include HDI allophanates (e.g., DESMODUR 3580 BA, DESMODUR XP 2860), HDI uretdiones (e.g., DESMODUR N 3400, DESMODUR XP 2840), HDI biuret trimers (e.g., BASONAT HB (commercially available from BASF (Ludwigshafen, Germany)), DESMODUR N100, DESMODUR N 3200, DESMODUR N 75), MDI allophanate-modified prepolymers (e.g., MONDUR MA 2603), IPDI isocyanurates (e.g., DESMODUR Z 4470 BA, DESMODUR Z 4470 SN, DESMODUR Z 4470 MPA/X), IPDI allophanates (e.g., DESMODUR XP 2565, BAYHYDUR XP2759, BAYHYDUR 401-70 MPA/X), all commercially available from Covestro (Leverkusen, Germany) unless otherwise indicated.

The prepolymer mixture may comprise the polyfunctional isocyanate in an amount of at least 20 wt %, or at least 30 wt %, or at least 40 wt %, or at least 50 wt %, based on the total resin solids content of the prepolymer mixture. The prepolymer mixture may comprise the polyfunctional isocyanate in an amount of up to 95 wt %, or up to 90 wt %, or up to 80 wt %, or up to 70 wt %, based on the total resin solids content of the prepolymer mixture. The prepolymer mixture may comprise the polyfunctional isocyanate in an amount ranging from 20 wt % to 95 wt %, or ranging from 30 wt % to 90 wt %, or ranging from 40 wt % to 90 wt %, or ranging from 50 wt % to 90 wt %, based on the total resin solids content of the prepolymer mixture.

The prepolymer mixture comprises a first compound comprising two or more active hydrogen groups. The first compound may comprise a monomeric, oligomeric, and/or polymeric compound. The first compound comprising two or more active hydrogen groups may comprise a polyol having two or more hydroxyl groups. The first compound comprising two or more active hydrogen groups may comprise a polyamine comprising two or more amine groups. The first compound comprising two or more active hydrogen groups may comprise an amino alcohol may comprise at least one hydroxyl group and at least one amine group.

The first compound comprising two or more active hydrogen groups may comprise a first polyol. The first polyol may comprise a diol. The first polyol may comprise greater than two hydroxyl functional groups. The prepolymer mixture may comprise a mixture of a diol and a polyol comprising greater than two hydroxyl functional groups; as such, the prepolymer mixture may comprise a first polyol and a second polyol different from the first polyol.

The first compound comprising two or more active hydrogen groups (e.g., the first polyol) may comprise an acid group. The acid group comprising polyol may comprise dimethylol propionic acid (DMPA), dimethylol butanoic acid (DMBA), and/or an acid derived from trimellitic anhydride, such as any acid resulting from a reaction resulting in the ring opening of trimellitic anhydride. The first compound comprising two or more active hydrogen groups may comprise an acid functional polyurethane and/or polyester compound comprising two or more active hydrogen groups.

The first compound comprising two or more active hydrogen group may not comprise an acid group.

The first compound comprising two or more active hydrogen groups may comprise a polyester compound, a polyether compound, a polycarbonate compound, a polyurethane compound, a polyurea compound, a polyurethane-urea compound, a silicone-containing compound, and/or mixtures or combinations thereof. The compound may comprise a polyol. This first compound comprising two or more active hydrogen groups may comprise a cyclic-substituted polyester compound, such as a cyclic-substituted polyester polyol. The cyclic-substituted polyester polyol may be formed from a reaction mixture of neopentyl glycol hydroxyl pivalate, 2-methyl-1,3-propanediol, and 1,4-cyclohexanedicarboxylic acid.

Non-limiting examples of suitable diols include straight chain alkane diols such as ethylene glycol, diethylene glycol, triethylene glycol, tetraethylene glycol, 1,2-ethanediol, propane diols such as 1,2-propanediol and 1,3-propanediol, butane diols such as 1,2-butanediol, 1,3-butanediol, and 1,4-butanediol, pentane diols such as 1,5-pentanediol, 1,3-pentanediol and 2,4-pentanediol, hexane diols such as 1,6-hexanediol and 2,5-hexanediol, heptane diols such as 2,4-heptanediol, octane diols such as 1,8-octanediol, nonane diols such as 1,9-nonanediol, decane diols such as 1,10-decanediol, dodecane diols such as 1,12-dodecanediol, octadecanediols such as 1,18-octadecanediol, and mixtures thereof. In some non-limiting embodiments, one or more carbon atoms in the polyol can be replaced with one or more heteroatoms, such as N, S, or O, for example sulfonated polyols, such as dithio-octane bis diol, thiodiethanol such as 2,2-thiodiethanol, or 3,6-dithia-1,2-octanediol, and/or mixtures or combinations thereof.

Other non-limiting examples of suitable diols include those represented by the following formula:

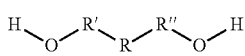

wherein R represents a $C_1$ to $C_{18}$ divalent linear or branched aliphatic, cycloaliphatic, aromatic, heterocyclic, or oligomeric saturated alkylene radical or mixtures thereof; a $C_2$ to $C_{18}$ divalent organic radical containing at least one element selected from the group consisting of sulfur, oxygen and silicon in addition to carbon and hydrogen atoms; a $C_5$ to $C_{18}$ divalent saturated cycloalkylene radical; or a $C_5$ to $C_{18}$ divalent saturated heterocycloalkylene radical; and R' and R" can be present or absent and, if present, each independently represent a $C_1$ to $C_{18}$ divalent linear or branched aliphatic, cycloaliphatic, aromatic, heterocyclic, polymeric, or oligomeric saturated alkylene radical, and/or mixtures or combinations thereof.

Other non-limiting examples of suitable diols include branched chain alkane diols, such as propylene glycol, dipropylene glycol, tripropylene glycol, neopentyl glycol, 2-methyl-butanediol, 2-methyl-propanediol, 2,2,4-trimethyl-1,3-pentanediol, 2-methyl-1,3-pentanediol, 2-ethyl-1,3-hexanediol, 2-methyl-1,3-propanediol, 2,2-dimethyl-1,3-propanediol, dibutyl 1,3-propanediol, polyalkylene glycols such as polyethylene glycols, and/or mixtures or combinations thereof.

In some non-limiting embodiments, the diol can be a cycloalkane diol, such as cyclopentanediol, 1,4-cyclohexanediol, cyclohexanedimethanols (CHDM), such as 1,4-cyclohexanedimethanol, cyclododecanediol, 4,4'-isopropylidene-biscyclohexanol, hydroxypropylcyclohexanol, cyclohexanediethanol, 1,2-bis(hydroxymethyl)-cyclohexane, 1,2-bis(hydroxyethyl)-cyclohexane, 4,4'-isopropylidene-biscyclohexanol, bis(4-hydroxycyclohexanol)methane, and/or mixtures or combinations thereof.

In some non-limiting embodiments, the diol can be an aromatic diol, such as dihydroxybenzene, 1,4-benzenedimethanol, xylene glycol, hydroxybenzyl alcohol and dihydroxytoluene; bisphenols, such as, 4,4'-isopropylidenediphenol, 4,4'-oxybisphenol, 4,4'-dihydroxybenzophenone, 4,4'-thiobisphenol, phenolphthalein, bis(4-hydroxyphenyl) methane, 4,4'-(1,2-ethenediyl)bisphenol and 4,4'-sulfonylbisphenol; halogenated bisphenols, such as 4,4'-isopropylidenebis(2,6-dibromophenol), 4,4'-isopropylidenebis(2,6-dichlorophenol) and 4,4'-isopropylidenebis(2,3,5,6-tetrachlorophenol); alkoxylated bisphenols, which can have, for example, ethoxy, propoxy, α-butoxy and β-butoxy groups; and biscyclohexanols, which can be prepared by hydrogenating the corresponding bisphenols, such as 4,4'-isopropylidene-biscyclohexanol, 4,4'-oxybiscyclohexanol, 4,4'-thiobiscyclohexanol and bis(4-hydroxycyclohexanol) methane, the alkoxylation product of 1 mole of 2,2-bis(4-hydroxyphenyl)propane (i.e., bisphenol-A) and 2 moles of propylene oxide, hydroxyalkyl terephthalates such as meta or para bis(2-hydroxyethyl) terephthalate, bis(hydroxyethyl) hydroquinone, and/or mixtures or combinations thereof.

In some non-limiting embodiments, the diol can be an heterocyclic diol, for example a dihydroxy piperidine such as 1,4-bis(hydroxyethyl)piperazine, a diol of an amide or alkane amide (such as ethanediamide (oxamide)), for example N,N',bis(2-hydroxyethyl)oxamide, a diol of a propionate, such as 2,2-dimethyl-3-hydroxypropyl-2,2-dimethyl-3-hydroxypropionate, a diol of a hydantoin, such as bishydroxypropyl hydantoin, a diol of a phthalate, such as meta or para bis(2-hydroxyethyl) terephthalate, a diol of a hydroquinone, such as a dihydroxyethylhydroquinone, and/ or a diol of an isocyanurate, such as dihydroxyethyl isocyanurate, and/or mixtures or combinations thereof.

Non-limiting examples of suitable polyfunctional polyols comprising greater than two hydroxyl functional groups include trimethylol propane (TMP), di(trimethylolpropane), trimethylol ethane, glycerol, pentaerythritol, 1,2,6-hexanetriol, sorbitol, mannitol, and/or mixtures or combinations thereof.

The first compound comprising two or more active hydrogen groups may comprise a polyamine, such as a diamine or triamine. Non-limiting examples of suitable polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-propylene diamine, diethylene triamine, dipropylene triamine, aminopropyldiethanolamine, 1,8-octane diamine, isophorone diamine, propane-2,2-cyclohexyl amine, and the like. Suitable aromatic diamines include phenylene diamines and the toluene diamines, for example, o-phenylene diamine and p-toluene diamine.

The first compound comprising two or more active hydrogen groups may comprise an amino alcohol. Non-limiting examples of suitable amino alcohols include ethanolamine, diethanolamine, n-methylethanolamine, aminomethylpropanol, aminopropyldiethanolamine, and/or mixtures or combinations thereof.

The prepolymer mixture may comprise the first compound comprising two or more active hydrogen groups in an amount of at least 5 wt %, or at least 10 wt %, or at least 20 wt %, or at least 30 wt %, based on the total resin solids content of the prepolymer mixture. The prepolymer mixture may comprise the first compound comprising two or more active hydrogen groups in an amount of up to 80 wt %, or up to 70 wt %, or up to 60 wt %, or up to 50 wt %, based on the total resin solids content of the prepolymer mixture. The prepolymer mixture may comprise the first compound comprising two or more active hydrogen groups in an amount ranging from 5 wt % to 80 wt %, or ranging from 10 wt % to 70 wt %, or ranging from 10 wt % to 60 wt %, or ranging from 10 wt % to 50 wt %, based on the total resin solids content of the prepolymer mixture.

The prepolymer mixture may optionally comprise a second compound comprising two or more active hydrogen groups different from the first compound comprising two or more active hydrogen groups. The second compound may comprise a monomeric, oligomeric, and/or polymeric compound. The second compound comprising two or more active hydrogen groups may comprise any of the compounds comprising two or more active hydrogen groups previously listed for the first compound comprising two or more active hydrogen groups. The prepolymer mixture may comprise a first compound comprising two or more active hydrogen groups comprising greater than two active hydrogen (e.g., hydroxyl and/or amine) groups and a second compound comprising two or more active hydrogen groups comprising an acid group.

The prepolymer mixture may comprise the second compound comprising two or more active hydrogen groups in an amount of at least 5 wt %, or at least 10 wt %, or at least 20 wt %, or at least 25 wt %, based on the total resin solids content of the prepolymer mixture. The prepolymer mixture may comprise the second compound comprising two or more active hydrogen groups in an amount of up to 75 wt %, or up to 70 wt %, or up to 60 wt %, or up to 50 wt %, based on the total resin solids content of the prepolymer mixture. The prepolymer mixture may comprise the second compound comprising two or more active hydrogen groups in an amount ranging from 5 wt % to 75 wt %, or ranging from 10 wt % to 70 wt %, or ranging from 10 wt % to 60 wt %, or ranging from 10 wt % to 50 wt %, or ranging from 10 wt % to 30 wt % based on the total resin solids content of the prepolymer mixture.

The prepolymer mixture may comprise a polyfunctional isocyanate comprising greater than two isocyanate functional groups and a first compound comprising two or more active hydrogen groups that comprises an acid group.

The prepolymer mixture may comprise a polyfunctional isocyanate comprising greater than two isocyanate functional groups and a first compound comprising two or more active hydrogen groups that comprises dimethylol propionic acid. The crosslinker composition may have a hydrazide equivalent weight of up to 3,000, or up to 2,000, or up to 1,000, or from 200 to 3,000, or from 200 to 2,000, or from 200 to 1,000, or from 250 to 3,000, or from 250 to 2,000, or from 250 to 1,000 based on the total resin solids content of the crosslinker composition. Equivalent weights are reported herein using the units of g/mol.

The prepolymer mixture may further comprise (iii) a compound comprising an acid group, wherein the compound comprising the acid group is different from (i) the polyfunctional isocyanate and (ii) the first compound comprising two or more active hydrogen groups. When (iii) the compound comprising an acid group is included in the prepolymer mixture, (i) the polyfunctional isocyanate and (ii) the first compound comprising two or more active hydrogen groups may be free of acid groups. The (iii) compound comprising the acid group may react in the prepolymer mixture to introduce acid groups onto the prepolymer. The (iii) compound may comprise an acid functional polyester derived from acids, anhydrides, or other acid derivatives. The (iii) compound may comprise an acid functional polyurethane.

The prepolymer mixture may comprise a solvent medium. As used herein, a "solvent medium" refers to a liquid medium comprising greater than 50 wt % solvent, based on the total weight of the liquid medium, where the liquid medium is defined as water and organic solvents which are liquid at ambient temperature (20-25° C.) and volatile at 110° C. as defined by ASTM D2369-93. As such, it will be appreciated that the liquid medium basis does not include diluents which are liquid at ambient temperature but not volatile at 110° C. as defined by ASTM D2369-93. Such solvent mediums can for example comprise at least 60 wt % organic solvent, or at least 70 wt % organic solvent, or at least 80 wt % organic solvent, or at least 90 wt % organic solvent, or at least 95 wt % organic solvent, or 100 wt % organic solvent, based on the total weight of the liquid medium. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons.

The prepolymer may comprise isocyanate functionality greater than two.

The prepolymer may comprise additional functional group(s) (in addition to the isocyanate and acid functional groups and urethane linkages). Non-limiting examples of functional groups that may be present on the prepolymer include, carbonyl groups, hydroxyl groups, amine groups, thiol groups, carbamate groups, amide groups, aldehyde groups, ester linkages, ether linkages, urea linkages, and/or combinations thereof. The prepolymer may comprise ester linkages, ether linkages, urethane linkages, and/or silicon-containing groups.

The prepolymer can be prepared according to any method known in the art, such as by reacting a prepolymer mixture comprising a polyfunctional isocyanate and a first compound comprising two or more active hydrogen groups. The components in the prepolymer mixture that form the prepolymer may react via any method known in the art, such as via a step-growth polymerization, where bifunctional or greater monomers react with each other to form dimers, then trimers, then oligomers, until the chain length reaches that of a desired prepolymer. The step-growth polymerization may be a condensation polymerization, where a byproduct is produced from the formation of the prepolymer that may be removed to affect the reaction kinetics of the prepolymer. Alternatively, the step-growth polymerization may not be a condensation polymerization, such that no byproduct is produced during formation of the prepolymer.

The reaction mixture that is used to prepare the crosslinker composition may comprise the prepolymer and a polyfunctional hydrazide.

The reaction mixture may comprise the prepolymer in an amount of at least 50 wt %, or at least 60 wt %, or at least 70 wt %, or at least 75 wt %%, based on the total resin solids content of the reaction mixture. The reaction mixture that is used to prepare the crosslinker composition may comprise the prepolymer in an amount of up to 95 wt %, or up to 90 wt %, or up to 85 wt %, based on the total resin solids content of the reaction mixture. The reaction mixture that is used to prepare the crosslinker composition may comprise the prepolymer in an amount ranging from 50 wt % to 95 wt %, or ranging from 65 wt % to 90 wt %, or ranging from 70 wt % to 85 wt %, or ranging from 75 wt % to 85 wt %, based on the total resin solids content of the reaction mixture.

The reaction mixture further comprises a polyfunctional hydrazide. As used herein, a "polyfunctional" hydrazide refers to a compound that comprises two or more hydrazide (—CONRNR2) groups. The polyfunctional hydrazide may comprise non-polymeric polyfunctional hydrazides, polymeric polyfunctional hydrazides, or combinations thereof. Non-limiting examples of suitable non-polymeric polyfunctional hydrazides include maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic acid dihydrazide, sebacic dihydrazide, and combinations thereof. The polymeric polyfunctional hydrazides can include various types of polymers comprising two or more hydrazide functional groups, such as, but not limited to, polyester polyfunctional hydrazides, polyurethane polyfunctional hydrazides, polyether polyfunctional hydrazides, and/or mixtures or combinations thereof.

As used herein, the term "hydrazide functional group" refers to a group having the following structure (I), and a hydrazide functional material (e.g., hydrazide functional polymer, hydrazide functional oligomer, hydrazide functional compound) refers to a material comprising at least one hydrazide functional group:

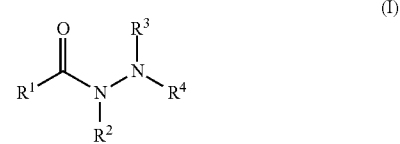

(I)

where $R^1$ is an alkyl, cycloalkyl, or aryl group bonded directly to the carbonyl carbon, wherein the alkyl, cycloalkyl, or aryl group bonded to the carbonyl carbon may be a linking group bonded to another suitable atom, monomer, oligomer, polymer, or other residue; and at least one of $R^2$-$R^4$ is a hydrogen atom and the remainder are any suitable atom, monomer, oligomer, polymer, or other residue, and wherein the $R^2$-$R^4$ groups may be the same or different from one another. The suitable atom may include a hydrogen atom (where chemically suitable) or any other suitable atom. A structure (I) in which at least one of $R^2$-$R^4$ is a hydrogen atom may react with formaldehyde as a crosslinking reaction to form a thermoset coating layer. A structure (I) in which both $R^3$ and $R^4$ is a hydrogen atom may react with a polyfunctional ketone and/or a polyfunctional aldehyde as a crosslinking reaction to form a thermoset coating layer.

The reaction mixture may comprise the polyfunctional hydrazide in an amount of at least 5 wt %, or at least 10 wt %, or at least 15 wt %, or at least 20 wt %, based on the total resin solids content of the reaction mixture. The reaction mixture that is used to prepare the crosslinker composition may comprise the polyfunctional hydrazide in an amount of up to 40 wt %, or up to 35 wt %, or up to 30 wt %, or up to 25 wt %, based on the total resin solids content of the reaction mixture. The reaction mixture that is used to prepare the crosslinker composition may comprise the polyfunctional hydrazide in an amount ranging from 5 wt % to 40 wt %, or ranging from 10 wt % to 40 wt %, or ranging from 15 wt % to 40 wt %, or ranging from 20 wt % to 40 wt %, based on the total resin solids content of the reaction mixture.

The crosslinker composition may comprise a hydrazide equivalent weight of up to 3,000, or up to 2,000, or up to 1,500, or up to 1,000, or up to 800, or up to 600, based on the total resin solids content of the crosslinker composition. The crosslinker composition may comprise a hydrazide equivalent weight of at least 175, or at least 200, or at least 250, or at least 300, or at least 400, based on the total resin solids content of the crosslinker composition. The crosslinker composition may comprise a hydrazide equivalent weight ranging from 175 to 3,000, or ranging from 200 to 2,000, or ranging from 200 to 1,000, or ranging from 250 to 1,000, or ranging from 300 to 800, or ranging from 400 to 600, based on the total resin solids content of the crosslinker composition.

The reaction mixture may comprise water. For example, the reaction mixture may comprise an aqueous medium. As used herein, an "aqueous medium" refers to a liquid medium comprising at least 50 wt % water, based on the total weight of the liquid medium, where the liquid medium is defined as water and organic solvents which are liquid at ambient temperature and volatile at 110° C. as defined by ASTM D2369-93. As such, it will be appreciated that the liquid medium basis does not include diluents which are liquid at ambient temperature but not volatile at 110° C. as defined by ASTM D2369-93. Such aqueous mediums can for example comprise at least 60 wt % water, or at least 70 wt % water, or at least 80 wt % water, or at least 90 wt % water, or at least 95 wt % water, or 100 wt % water, based on the total weight of the liquid medium. The solvents that, if present, make up less than 50 wt % of the liquid medium include organic solvents. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons.

The reaction mixture may comprise a neutralizing amine. As used herein, a "neutralizing" amine refers to a compound that comprises at least one amine group and a pH of greater than 7 as determined at 20-25° C. The neutralizing amine may at least partially neutralize the acid groups on the prepolymer. Suitable neutralizing amines include triethanolamine, ammonium hydroxide, dimethylamine, trimethylamine, triethylamine, monoethanolamine, diisopropanolamine, diethanolamine, dimethylethanolamine, and/or mixtures or combinations thereof.

The prepolymer may be at least 15% neutralized using the neutralizing amine, such as at least 20% neutralized, at least 25% neutralized, or at least 30% neutralized. The prepolymer may be up to 120% neutralized using the neutralizing amine, such as up to 100% neutralized, up to 80% neutralized, up to 60% neutralized, or up to 50% neutralized. The prepolymer may be from 15% to 120% neutralized using the neutralizing amine, such as from 25% to 100% neutralized, from 50% to 100% neutralized, from 60% to 100% neutralized, from 70% to 100% neutralized, from 80% to 100% neutralized. Neutralization of the prepolymer (total neutralization percent) may be theoretically determined based on the equivalence of the amine (of the neutralizing amine) divided by the equivalence of the acid (of the prepolymer).

The reaction mixture and/or the prepolymer mixture may be may be substantially free, essentially free, or completely free of an epoxy. As used herein, "substantially free of an epoxy" means that the reaction mixture and/or the prepolymer mixture comprises less than 5 wt % of an epoxy based on the total resin solids content of the reaction mixture and/or the prepolymer mixture. As used herein, "essentially free of an epoxy" means that the reaction mixture and/or the prepolymer mixture comprises less than 1 wt % of an epoxy based on the total resin solids content of the reaction mixture and/or the prepolymer mixture. As used herein, "completely free of an epoxy" means that the reaction mixture and/or the prepolymer mixture comprises 0 wt % of an epoxy based on the total resin solids content of the reaction mixture and/or the prepolymer mixture.

The reaction mixture and/or the prepolymer mixture may be may be substantially free, essentially free, or completely free of vinyl unsaturation (a monomer comprising vinyl unsaturation). As used herein, "substantially free of vinyl unsaturation" means that the reaction mixture and/or the prepolymer mixture comprises less than 5 wt % of monomers comprising vinyl unsaturation based on the total resin solids content of the reaction mixture and/or the prepolymer mixture. As used herein, "essentially free of vinyl unsaturation" means that the reaction mixture and/or the prepolymer mixture comprises less than 1 wt % of monomers comprising vinyl unsaturation based on the total resin solids content of the reaction mixture and/or the prepolymer mixture. As used herein, "completely free of vinyl unsaturation" means that the reaction mixture and/or the prepolymer mixture comprises 0 wt % of monomers comprising vinyl unsaturation based on the total resin solids content of the reaction mixture and/or the prepolymer mixture.

The crosslinker composition may be may be substantially free, essentially free, or completely free of a keto and/or aldo-functional group. As used herein, "substantially free of keto and/or aldo functional groups" means that the crosslinker composition has a ratio of keto and/or aldo equivalent weight:hydrazide equivalent weight (based on resin solids of the crosslinker composition) less than 1:5; "essentially free of keto and/or aldo functional groups" means that the crosslinker composition has a ratio of keto and/or aldo equivalent weight:hydrazide equivalent weight (based on resin solids of the crosslinker composition) less than 1:10; "completely free of keto and/or aldo functional groups" means that the crosslinker composition comprises no keto and/or aldo functional groups.

The crosslinker composition may have a weight average molecular weight of at least 30,000 g/mol, or at least 50,000 g/mol, or at least 70,000 g/mol. The crosslinker composition may have a weight average molecular weight of up to 500,000 g/mol, or up to 250,000 g/mol, or up to 100,000 g/mol. The crosslinker composition may have a weight average molecular weight ranging from 30,000 to 500,000 g/mol, or ranging from 30,000 to 250,000 g/mol, or ranging from 30,000 to 100,000 g/mol.

Molecular weight, as used herein, is determined by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the ambient temperature; weight and number average molecular weight of polymeric samples can be measured by gel permeation chromatography relative to linear polystyrene standards of 800 to 900,000 Da). Molecular weights are reported herein using the units of g/mol.

The crosslinker composition may have an acid value of at least 15, such as at least 18, or at least 20, based on total resin solids of the crosslinker composition. Acid values are determined using a Metrohm 798 MPT Titrino automatic titrator according to ASTM D 4662-15.

The crosslinker composition may comprise greater than two hydrazide functional groups.

The crosslinker composition may comprise an aqueous dispersion. As used herein, the term "dispersion" refers to a two-phase system in which one phase includes finely divided particles distributed throughout a second phase, which is a continuous phase. The continuous phase may comprise the aqueous medium, in which the polymeric particles are suspended therein. The particles may have an average particle size of from 20 to 2000 nm, such as from 50 to 1000 nm, from 50 to 500 nm, from 50 to 200 nm, from 70 to 150 nm, or from 80 to 150 nm, as determined with a Zetasizer 3000HS by diluting the sample in water or solvent in a cuvette to the point that the sample is still transparent (approximately 1000× dilution) and placing the cuvette into the instrument where the particle size is measured using the dynamic light scattering technique. In the aqueous dispersion, the continuous phase comprises an aqueous medium.

The crosslinker composition may be not self-crosslinkable. As used herein, "self-crosslinkable" refers to a composition in which the ratio of keto and/or aldo equivalent weight:hydrazide equivalent weight (based on resin solids of the crosslinker composition) is at least 1:5. As such, the non-self-crosslinkable crosslinker composition has a ratio of keto and/or aldo equivalent weight:hydrazide equivalent weight of less than 1:5.

The present invention also relates to a coating composition, comprising: the previously-described crosslinker and a polymer reactive with the crosslinker composition, wherein the polymer comprises a carbonyl-functional group.

The coating composition comprises the crosslinker composition. The coating composition may comprise the crosslinker composition in an amount of at least 5 wt %, or at least 10 wt %, or at least 15 wt %, or at least 20 wt %, based on the total resin solids content of the coating composition. The coating composition may comprise the crosslinker composition in an amount of up to 80 wt %, or up to 60 wt %, or up to 40 wt %, or up to 30 wt %, based on the total resin solids content of the crosslinker composition. The coating composition may comprise the crosslinker composition in an amount ranging from 5 wt % to 80 wt %, or ranging from 10 wt % to 60 wt %, or ranging from 10 wt % to 40 wt %, or ranging from 20 wt % to 30 wt %, based on the total resin solids content of the coating composition.

The coating composition further comprises a polymer which is reactive with the crosslinker composition. For example, the carbonyl group on the polymer may react with the hydrazide functional group on the crosslinker composition. The polymer in the coating composition may be any suitable polymer comprising a carbonyl-functional group. Non-limiting examples of polymers that may be used in the coating composition include polyolefins, (meth)acrylate resins, polyurethanes, polyesters, polyamides, polyethers, polysiloxanes, epoxy resins, vinyl resins, copolymers thereof, and combinations thereof. The polymer may comprise a keto and/or aldo-functional: acrylic, epoxy, polyester, polyurethane, polyurethane-acrylate, and/or the like. The polymer may comprise a compound derived from levulinic acid, such as any compound resulting from a reaction including levulinic acid. The polymer may comprise a compound derived from diacetone acrylamide (DAAM), such as any compound resulting from a reaction including DAAM. The hydrazide functionality on the crosslinker may react with formaldehyde, polyformaldehyde, or formaldehyde generated from a compound that generates formaldehyde, such as a melamine-formaldehyde resin. The crosslinker composition could be pre-reacted with formaldehyde to form an n-methylolated functional hydrazide crosslinker that could self-crosslink or react with a melamine formaldehyde resin.

The coating composition may comprise the polymer in an amount of at least 10 wt %, or at least 15 wt %, or at least 20 wt %, or at least 30 wt %, based on the total resin solids content of the coating composition. The coating composition may comprise the polymer in an amount of up to 95 wt %, or up to 85 wt %, or up to 75 wt %, or up to 65 wt %, based on the total resin solids content of the crosslinker composition. The coating composition may comprise the polymer in an amount ranging from 10 wt % to 95 wt %, or ranging from 10 wt % to 65 wt %, or ranging from 15 wt % to 65 wt %, or ranging from 30 wt % to 65 wt %, based on the total resin solids content of the coating composition.

The coating composition may further comprise a second polymer, different from the above-described polymer. The second polymer may comprise a polyester polymer. The polyester polymer may be obtained from components comprising polytetrahydrofuran and a carboxylic acid or anhydride thereof. The polyester polymer may comprise a hydroxyl functional group.

The carboxylic acid or anhydride used to form the polyester polymer can be selected from various types of polycarboxylic acids or the anhydrides thereof, such as from a dicarboxylic acid or anhydride thereof, or from a polycarboxylic acid having three or more carboxylic acid groups or the anhydrides thereof. The carboxylic acid or anhydride thereof can also be selected from compounds having aromatic rings or aliphatic structures. As used herein, an "aromatic group" refers to a cyclically conjugated hydrocarbon with a stability (due to delocalization) that is significantly greater than that of a hypothetical localized structure. Further, the term "aliphatic" refers to non-aromatic straight, branched, or cyclic hydrocarbon structures that contain saturated carbon bonds.

Non-limiting examples of carboxylic acids used to form the polyester polymer include any of those previously listed.

As indicated, an anhydride can be used, such as an anhydride of any of the previously described carboxylic acids. The carboxylic acid or anhydride may comprise trimellitic acid and/or anhydride. Non-limiting examples of such anhydrides include trimellitic anhydride, phthalic anhydride, maleic anhydride, succinic anhydride, malonic anhydride, oxalic anhydride, hexahydrophthalic anhydride, adipic anhydride, and combinations thereof.

As indicated, the carboxylic acid or anhydride thereof can be selected from compounds having aromatic rings or aliphatic structures. For instance, the carboxylic acid or anhydride thereof can be selected from an aromatic compound in which the carboxylic acid or anhydride functional groups are bonded directly to the aromatic ring(s) such that there is no interrupting atoms between the aromatic ring(s) and the attached carboxylic acid or anhydride functional groups (a non-limiting example being trimellitic anhydride).

The polyester polymer can also be prepared with other components in addition to the previously described polytetrahydrofuran and carboxylic acid or anhydride thereof. Non-limiting examples of additional components that can be used to form the polyester polymer include polyols in addition to the polytetrahydrofuran, additional compounds containing one or more carboxylic acid groups or anhydrides thereof, ethylenically unsaturated compounds, polyisocyanates, and combinations thereof.

Non-limiting examples of polyols used to form the polyester polymer include glycols, polyether polyols, polyester polyols, copolymers thereof, and combinations thereof. Non-limiting examples of glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols in addition to the polytetrahydrofuran include polyethylene glycol, polypropylene glycol, polybutylene glycol, and combinations thereof.

Other suitable polyols used to form the polyester polymer include any of those previously listed. It is appreciated that the polyol can be selected from diols and/or from compounds having 3 or more hydroxyl groups.

The additional compounds containing one or more carboxylic acid groups or anhydrides that can be used to form the polyester polymer include any of the previously described carboxylic acids and anhydrides provided that the additional compound is different from the first carboxylic acid or anhydride. For instance, the components that form the polyester polymer can include both trimellitic anhydride and maleic anhydride.

Non-limiting examples of ethylenically unsaturated monomers, including those containing an acid group, used to form the polyester polymer include any of those previously listed. Non-limiting examples of vinyl aromatic monomers used to form the polyester polymer include any of those previously listed. Non-limiting examples of suitable polyisocyanates used to form the polyester polymer include any of those previously listed.

It is appreciated that the previously described optional additional components can be used to modify or adjust the properties of the polyester polymer and the final coating formed therewith. For instance, the polyester polymer can be formed with additional components, such as an additional polyol, that can provide a faster cure at lower bake temperatures such as temperatures of 80° C. or lower.

The polytetrahydrofuran used to form the polyester polymer can comprise greater than 20 wt % of the components that form the polyester polymer, or greater than 30 wt % of the components that form the polyester polymer, or greater than 40 wt % of the components that form the polyester polymer. The polytetrahydrofuran can also comprise up to 50 wt % of the components that form the polyester polymer, or up to 60 wt % of the components that form the polyester polymer, or up to 70 wt % of the components that form the polyester polymer, or up to 80 wt % of the components that form the polyester polymer, or up to 90 wt % of the components that form the polyester polymer. The polytetrahydrofuran can further comprise an amount within a range such as from 20 wt % to 90 wt % of the components that form the polyester polymer, or from 40 wt % to 80 wt % of the components that form the polyester polymer, or from 50 wt % to 70 wt % of the components that form the polyester polymer, or from 30 wt % to 40 wt % of the components that form the polyester polymer.

The carboxylic acid or anhydride used to form the polyester polymer can comprise greater than 5 wt % of the components that form the polyester polymer, or greater than 8 wt % of the components that form the polyester polymer. The carboxylic acid or anhydride can also comprise up to 20 wt % of the components that form the polyester polymer, or up to 15 wt % of the components that form the polyester polymer, or up to 12 wt % of the components that form the polyester polymer. The carboxylic acid or anhydride can further comprise an amount within a range such as from 5 wt % to 20 wt % of the components that form the polyester polymer, or from 8 wt % to 15 wt % of the components that form the polyester polymer, or from 8 wt % to 12 wt % of the components that form the polyester polymer, or from 7 wt % to 10 wt % of the components that form the polyester polymer.

It is appreciated that one or more of the previously described additional components can make up the remaining amount of components used to form the polyester polymer. For example, the polyester polymer can be prepared with polytetrahydrofuran, a carboxylic acid or anhydride, a polyol that is different from the polytetrahydrofuran, and another carboxylic acid or anhydride that is different from the first carboxylic acid or anhydride.

The resulting polyester polymer prepared from the previously described components may comprise ether linkages and/or carboxylic acid functional groups. The polyester polymer can also comprise urethane linkages as well as additional functional groups such as hydroxyl functional groups. For instance, the polyester polymer can comprise ether linkages, ester linkages, carboxylic acid functional groups, and hydroxyl functional groups. The polyester polymer can also comprise additional linkages and functional groups including, but not limited to, the previously described additional functional groups.

The polyester polymer can have an acid value of at least 15, at least 20, at least 30, at least 35, or at least 40, based on the total resin solids of the polyester polymer. The polyester polymer can have an acid value of up to 60, up to 55, up to 50, up to 45, up to 40, up to 35, or up to 30, based on the total resin solids of the polyester polymer. The polyester polymer can have an acid value ranging from 15 to 60, such as from 20 to 30, from 20 to 50, from 20 to 60, from 30 to 50, from 30 to 60, from 35 to 60, from 35 to 50, from 40 to 50, or from 40 to 60, based on the total resin solids of the polyester polymer.

The acid functionality of the polyester polymer can have a pKa of less than 5, or less than 4, or less than 3.5, or less than 3, or less than 2.5, or less than 2. The acid functionality of the polyester polymer can be within a pKa range such as, for example, from 1.5 to 4.5. The pKa value is the negative (decadic) logarithms of the acidic dissociation constant, and is determined according to the titration method described in Lange's Handbook of Chemistry, 15th edition, section 8.2.1.

The carboxylic acid functionality found on the polyester polymer can be provided by the first carboxylic acid or anhydride only. Alternatively, when additional carboxylic acid functional compounds and/or anhydrides are used to form the polymer, the carboxylic acid functionality found on the polymer is provided by the first carboxylic acid or anhydride and the additional carboxylic acid functional compounds and/or anhydrides.

The polyester polymer can also comprise a hydroxyl equivalent weight of from 1500 to 5000, or from 2000 to 3000, as measured by reacting the dried polyester polymer with an excess amount of acetic anhydride and titrating with potassium hydroxide.

The second polymer may comprise a polyurethane polymer, a polyether polymer, a polycarbonate polymer, an acrylic polymer, a vinyl polymer, an epoxy polymer, a polysiloxane polymer, a fluoropolymer, and/or co-polymers and/or mixtures thereof The coating composition may include from 5 to 80 wt % of the second polymer based on total resin solids of the coating composition, such as from 5 to 70 wt %, from 5 to 60 wt %, from 5 to 50 wt %, from 5 to 40 wt %, from 5 to 30 wt %, from 5 to 20 wt %, from 10 to 40 wt %, from 10 to 30 wt %, from 10 to 20 wt %, from 15 to 30 wt %, or from 18 to 28 wt %.

The coating composition may further comprise an additional crosslinker (in addition to the polyfunctional hydrazide crosslinker from the crosslinker composition). The additional crosslinker may comprise carbodiimide, blocked isocyanate, oxazoline, and/or mixtures or combinations thereof, and such crosslinkers may be used in a 1K curing composition as defined hereinafter. The additional crosslinker may comprise a free polyisocyanate and/or epoxy crosslinker, and such crosslinkers may be used in a 2K curing composition as defined hereinafter.

The coating composition may have a pH of greater than 7, or greater than 8, or greater than 9, at ambient temperature as measured according to ASTM D4584.

The coating composition may comprise a waterborne coating composition. As used herein, "waterborne coating composition" refers to a coating composition comprising an aqueous medium as previously described.

The coating composition may be a one-component (1K) curing composition. As used herein, a "1K curing composition" refers to a composition wherein all the coating components are maintained in the same container after manufacture, during storage, and the like, and may remain stable for longer than 1 month at conditions of 40-120° F. (4-49° C.) at 0-95% relative humidity, such as longer than 3 months, longer than 6 months, longer than 9 months, or longer than 12 months. A 1K curing composition can be applied to a substrate and cured by any conventional means, such as by heating, forced air, and the like.

The coating composition may be a multi-component composition, such as a two component composition ("2K") or more, which has at least two components that are maintained in a different container after manufacture, during storage, etc. prior to application and formation of the coating over a substrate.

The coating composition can also include additional materials such as a pigment. The pigment may include a finely divided solid powder that is insoluble, but wettable, under the conditions of use. A pigment can be organic or inorganic and can be agglomerated or non-agglomerated. Pigments can be incorporated into the coating by use of a grind vehicle, such as an acrylic grind vehicle, the use of which will be familiar to one skilled in the art.

Suitable pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and/or mixtures or combinations thereof.

The pigment used with the coating composition can also comprise a special effect pigment. As used herein, a "special effect pigment" refers to a pigment that interacts with visible light to provide an appearance effect other than, or in addition to, a continuous unchanging color. Suitable special effect pigments include those that produce one or more appearance effects such as reflectance, pearlescence, metallic sheen, texture, phosphorescence, fluorescence, photochromism, photosensitivity, thermochromism, goniochromism, and/or color-change, such as transparent coated mica and/or synthetic mica, coated silica, coated alumina, aluminum flakes, a transparent liquid crystal pigment, a liquid crystal coating, and/or mixtures or combinations thereof.

Other suitable materials that can be used with the coating composition include, but are not limited to, plasticizers, abrasion resistant particles, coalescing agents, initiators, biocides, biostats, reinforcements, extenders, corrosion inhibitors, anti-oxidants, hindered amine light stabilizers, UV light absorbers and stabilizers, surfactants, flow and surface control agents, thixotropic agents, catalysts, reaction inhibitors, and other customary auxiliaries.

The coating composition may be applied to a substrate and cured to form a cured coating layer. The coating composition can be applied to the substrate in liquid form and cured to form a coating by allowing the coating composition to dry at conditions in the range of from −10° C. to 50° C., such as from 1° C. to 50° C.

The coating composition may be cured at a temperature of less than or equal to 150° C., such as less than or equal to 140° C., less than or equal to 120° C., such as less than or equal to 110° C., less than or equal to 100° C., less than or equal to 90° C., less than or equal to 80° C., less than or equal to 70° C., less than or equal to 60° C., or less than or equal to 50° C.

The substrate over which the coating composition may be applied includes a wide range of substrates. For example, the coating composition of the present invention can be applied to a vehicle substrate, an industrial substrate, an aerospace substrate, an architectural substrate, and the like.

The vehicle substrate may include a component of a vehicle. In the present disclosure, the term "vehicle" is used in its broadest sense and includes all types of aircraft, spacecraft, watercraft, and ground vehicles. For example, the vehicle can include, but is not limited to an aerospace substrate (a component of an aerospace vehicle, such as an aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), and the like). The vehicle can also include a ground vehicle such as, for example, animal trailers (e.g., horse trailers), all-terrain vehicles (ATVs), cars, trucks, buses, vans, heavy duty equipment, tractors, golf carts, motorcycles, bicycles, snowmobiles, trains, railroad cars, and the like. The vehicle can also include watercraft such as, for example, ships, boats, hovercrafts, and the like. The vehicle substrate may include a component of the body of the vehicle, such as an automotive hood, door, trunk, roof, and the like; such as an aircraft or spacecraft wing, fuselage, and the like; such as a watercraft hull, and the like.

The coating composition may be applied over an industrial substrate which may include tools, heavy duty equipment, furniture such as office furniture (e.g., office chairs, desks, filing cabinets, and the like), appliances such as refrigerators, ovens and ranges, dishwashers, microwaves, washing machines, dryers, small appliances (e.g., coffee makers, slow cookers, pressure cookers, blenders, etc.), metallic hardware, extruded metal such as extruded aluminum used in window framing, other indoor and outdoor metallic building materials, and the like.

The coating composition may be applied over storage tanks, windmills, nuclear plant components, packaging substrates, wood flooring and furniture, apparel, electronics, including housings and circuit boards, glass and transparencies, sports equipment, including golf balls, stadiums, buildings, bridges, and the like.

The substrate can be metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric materials, plastic and/or composite material, polyester, polyolefin, polyamide, cellulosic, polystyrene, polyacrylic, poly(ethylene naphthalate), polypropylene, polyethylene, nylon, ethylene vinyl alcohol (EVOH), polylactic acid, other "green" polymeric substrates, poly (ethyleneterephthalate) (PET), polycarbonate, polycarbonate acrylobutadiene styrene (PC/ABS), wood, veneer, wood composite, particle board, medium density fiberboard, cement, stone, glass, paper, cardboard, textiles, leather, both synthetic and natural, and the like. The substrate may comprise a metal, a plastic and/or composite material, and/or a fibrous material. The fibrous material may comprise a nylon and/or a thermoplastic polyolefin material with continuous strands or chopped carbon fiber. The substrate can be one that has already been treated in some manner, such as to impart visual and/or color effect, a protective pretreatment or other coating layer, and the like.

The coating composition of the present invention may be particularly beneficial when applied to a metallic substrate. The coatings of the present invention may be particularly beneficial when applied to metallic substrates that are used to fabricate automotive vehicles, such as cars, trucks, and tractors.

Suitable architectural substrates over which the coating compositions may be applied include, but are not limited to, metallic or non-metallic substrates including: concrete, stucco, masonry elements, cement board, MDF (medium density fiberboard) and particle board, gypsum board, wood, stone, metal, plastics (e.g., vinyl siding and recycled plastics), wall paper, textiles, plaster, fiberglass, ceramic, and the like, which may be pre-primed by waterborne or solvent borne primers. The architectural substrate may be an interior wall (or other interior surface) of a building or residence. The architectural substrate may be an outdoor substrate exposed to outdoor conditions. The architectural substrate may be smooth or textured.

The coating composition may be applied to a substrate having multiple components, wherein the coating composition is simultaneously applied to the multiple components and simultaneously cured to form a coating over the multiple components without deforming, distorting, or otherwise degrading any of the components. The components may be parts of a larger whole of the substrate. The components may be separately formed and subsequently arranged together to form the substrate. The components may be integrally formed to form the substrate.

Non-limiting examples of components of a substrate in the vehicle context include a vehicle body (e.g., made of metal) and a vehicle bumper (e.g., made or plastic) which are separately formed and subsequently arranged to form the substrate of the vehicle. Further examples include a plastic automotive component, such as a bumper or fascia in which the bumper or fascia comprises regions or subcomponents which comprise more than one type of substrate. Further examples include aerospace or industrial components comprising more than one substrate type. It will be appreciated that other such other multi-component substrates are contemplated within the context of this disclosure.

The multiple components may include at least a first component and a second component, and the first component and the second component may be formed from different materials. As used herein, "different materials" refers to the materials used to form the first and second component having different chemical make-ups.

The different materials may be from the same or different class of materials. As used herein, a "class of materials" refers to materials that may have a different specific chemical make-up but share the same or similar physical or chemical properties. For example, metals, polymers, ceramics, and composites may be defined as different classes of materials. However, other classes of materials may be defined depending on similarities in physical or chemical properties, such as nanomaterials, biomaterials, semiconductors, and the like. Classes of materials may include crystalline, semi-crystalline, and amorphous materials. Classes of materials, such as for polymers, may include thermosets, thermoplastics, elastomers, and the like. Classes of materials, such as for metals, may include alloys and non-alloys. As will be appreciated from the above exemplary list of classes, other relevant classes of materials may be defined based on a given physical or chemical property of materials.

The first component may be formed from a metal, and the second component may be formed from a plastic or a composite. The first component may be formed from a plastic, and the second component may be formed from a metal or a composite. The first component may be formed from a composite, and the second component may be formed from a plastic or a metal. The first component may be formed from a first metal, and the second component may be formed from a second metal different from the first metal. The first component may be formed from a first plastic, and the second component may be formed from a second plastic different from the first plastic. The first component may be formed from a first composite, and the second component may be formed from a second composite different from the first composite. As will be appreciated from these non-limiting examples, any combination of different materials from the same or different classes may form the first and second components.

Examples of combinations of materials include thermoplastic polyolefins (TPO) and metal, TPO and acrylonitrile butadiene styrene (ABS), TPO and acrylonitrile butadiene styrene/polycarbonate blend (ABS/PC), polypropylene and TPO, TPO and a fiber reinforced composite, and other combinations. Further examples include aerospace substrates or industrial substrates comprising various components made of a plurality of materials, such as various metal-plastic, metal-composite, and/or plastic-composite containing components. The metals may include ferrous metals and/or non-ferrous metals. Non-limiting examples of non-ferrous metals include aluminum, copper, magnesium, zinc, and the like, and alloys including at least one of these metals. Non-limiting examples of ferrous metals include iron, steel, and alloys thereof.

The first component and the second component (the materials thereof) may exhibit different physical or chemical properties when exposed to elevated temperatures. For example, the first component may deform, distort, or otherwise degrade at a temperature lower than the second component. Non-limiting examples of material properties which may indicate whether a first component deforms, distorts, or otherwise degrades at a temperature lower than the second component include: heat deflection temperature, embrittlement temperature, softening point, and other relevant material properties associated with deformation, distortion, or degradation of materials.

For example, the first component may deform, distort, or otherwise degrade at temperatures ranging from above 80° C. to 120° C., whereas the second component may not deform, distort, or otherwise degrade at temperatures within or below this range. The first component may deform, distort, or otherwise degrade at temperatures below 120° C., such as below 110° C., below 100° C., or below 90° C., whereas the second component may not deform, distort, or otherwise degrade at temperatures within these ranges.

When the coating composition is applied to the substrate having multiple components simultaneously, the applied coating composition may be cured at a temperature which does not deform, distort, or otherwise degrade either of the first and second component (the materials thereof). Thus, the curing temperature may be below the temperature at which either of the first component or the second component would deform, distort, or otherwise degrade. The coating composition may be cured at temperatures ranging from 20° C. to 120° C. or 80° C. to 120° C. where neither the first component nor the second component would deform, distort, or otherwise degrade within that range. The coating composition may be cured at temperatures less than or equal to 120° C., less than or equal to 110° C., less than or equal to 100° C., less than or equal to 90° C., less than or equal to 80° C., less than or equal to 70° C., less than or equal to 60° C., less than or equal to 50° C., less than or equal to 40° C., less than or equal to 30° C., or ambient temperature where neither the first component nor the second component would deform, distort, or otherwise degrade within these ranges.

Therefore, the coating composition may be curable at relatively low temperatures, within the ranges mentioned above, such that components formed from different materials may be simultaneously coated with the coating composition and cured to form a coating thereover without deforming, distorting, or otherwise degrading either component.

The coating compositions may be applied by any suitable application methods such as, for example, dipping, brushing, roller application, and spraying methods such as, for example, electrostatic spraying, air-atomized spray, air-assisted spray, airless spray, high volume low pressure spray, and air-assisted airless spray.

The coating composition formed from the coating system can be applied to a substrate to form a pigmented topcoat. The pigmented topcoat may be the topmost coating layer so as not to include a clearcoat or any other coating layer thereover. The pigmented topcoat may be applied directly to the substrate. The pigmented topcoat may be applied over a primer layer or a pretreatment layer.

The coating composition can be applied to a substrate as a coating layer of a multi-layer coating system, such that one or more additional coating layers are formed below and/or above the coating formed from the coating composition.

The coating composition can be applied to a substrate as a primer coating layer of the multi-layer coating system. A "primer coating layer" refers to an undercoating that may be deposited onto a substrate (e.g., directly or over a pretreatment layer) in order to prepare the surface for application of a protective or decorative coating system.

The coating composition can be applied to a substrate as a basecoat layer of the multi-layer coating system. A "basecoat" refers to a coating that is deposited onto a primer overlying a substrate and/or directly onto a substrate, optionally including components (such as pigments) that impact the color and/or provide other visual impact. A clearcoat may be applied over the basecoat layer The coating composition can be applied to a substrate as a topcoat layer of the multi-layer coating system. A "topcoat" refers to an uppermost coating that is deposited over another coating layer, such as a basecoat, to provide a protective and/or decorative layer, such as the previously described pigmented topcoat.

The topcoat layer used with the multi-layer coating system of the present invention may be a clearcoat layer, such as a clearcoat layer applied over a basecoat layer. As used herein, a "clearcoat" refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clearcoat can comprise colorants, such as pigments, provided that the colorants do not interfere with the desired transparency of the clearcoat. The clearcoat can be substantially free (e.g., less than 3 wt % based on total solids of the coating composition) or free of pigments.

The coating composition may be applied over a substrate as a layer in a multi-layer coating system. In the multi-layer coating system, a first basecoat layer may be applied over at least a portion of a substrate, wherein the first basecoat layer is formed from a first basecoat composition. A second basecoat layer may be applied over at least a portion of the first basecoat layer, wherein the second basecoat layer is formed from a second basecoat composition. The second basecoat layer may be applied after the first basecoat composition has been cured to form the first basecoat layer or may be applied in a wet-on-wet process prior to curing the first basecoat composition, after which the first and second basecoat compositions are simultaneously cured to form the first and second basecoat layers.

At least one of the first and second basecoat compositions may be the coating composition of the present invention. The first and second basecoat compositions may be the same composition with both the first and second basecoat compositions comprising the coating composition of the present invention. The first and second basecoat compositions may be different with only one of the first and second basecoat compositions comprising the coating composition of the present invention.

The multi-layer coating system may include a primer coating layer formed from a primer composition applied over the substrate. The first basecoat layer may be positioned over at least a portion of the primer coating layer.

The multi-layer coating system may include a topcoat layer formed from a topcoat composition applied over the substrate. The topcoat composition may be applied over at least a portion of the second basecoat layer. The topcoat may be a clearcoat.

A substrate having a multi-layer coating system applied thereover may be prepared by applying a first basecoat composition onto at least a portion of the substrate and applying a second basecoat composition directly onto at least a portion of the first basecoat composition. The first and second basecoat compositions may be cured simultaneously to form first and second basecoat layers. The first and second basecoat compositions may be cured at a temperature of 120° C. or less, such as 100° C. or less, such as 80° C. or less, to form the first and second basecoat layers. At least one of the first and second basecoat compositions may comprise the coating composition of the present invention.

Preparing the multi-layer coating system may include forming a primer coating layer over at least a portion of the substrate and applying the first basecoat composition onto at least a portion of the primer coating layer.

Preparing the multi-layer coating system may include applying a topcoat composition onto at least a portion of the second basecoat composition. The topcoat composition may be applied onto the second basecoat composition prior to or after curing the first and second basecoat compositions. The first basecoat composition, the second basecoat composition, and the topcoat composition may be simultaneously cured at a temperature of 120° C. or less, such as 100° C. or less, such as 80° C. or less.

EXAMPLES

The following examples are presented to demonstrate the general principles of the invention. The invention should not be considered as limited to the specific examples presented.

Example A

Preparation of a 2K Isocyanate Clearcoat for Application Over Basecoat Layers

A 2K isocyanate clearcoat composition was prepared using the components from Table A for application over the coating compositions prepared according to the present invention as described hereinafter in certain of the Examples. Amounts given in Table A are in grams.

TABLE A

| Description | Example A |
|---|---|
| Component A | |
| n-amyl acetate[a] | 742.56 |
| n-butyl acetate[b] | 1013.76 |
| ethyl 3-ethoxypropanoate[c] | 384.00 |
| TINUVIN 928[d] | 57.12 |
| TINUVIN 123[e] | 37.92 |

TABLE A-continued

| Description | Example A |
|---|---|
| Siloxane polyol[f] | 127.00 |
| Silica dispersion[g] | 845.06 |
| Silica dispersion[h] | 158.89 |
| Acrylic polyol[i] | 2692.54 |
| Polyester polyol[j] | 178.13 |
| PRISORINE 3501[k] | 192.00 |
| 10% BYK-378[r] in n-butyl acetate[b] | 24.00 |
| Sub Total | 6452.98 |
| Component B | |
| n-amyl acetate[a] | 384.00 |
| n-butyl acetate[b] | 177.60 |
| Aromatic 100[m] | 192.00 |
| 10% Dibutyl tin dilaurate[n] in xylene[o] | 24.00 |
| DESMODUR N-3300A[p] | 1845.60 |
| DESMODUR Z-4470 BA[q] | 603.43 |
| Subtotal | 3226.63 |
| Total | 9679.60 |

[a]A solvent available from Dow Chemical Company (Midland, MI)
[b]A solvent available from Dow Chemical Company (Midland, MI)
[c]A solvent available from Dow Chemical Company (Midland, MI)
[d]A benzotriazole UV absorber available from BASF Corporation (Charlotte, NC)
[e]A hindered amine light stabilizer available from BASF Corporation (Charlotte, NC)
[f]A siloxane polyol made in a stepwise process:
1) Synthesis of a siloxane polyol resin using SILRES IC 816 (methyl hydrogen polysiloxane resin from Wacker Chemie AG (Munich, Germany)) and trimethylolpropanemonoallyl ether using a hydrosilation reaction to form a siloxane polyol resin at 100% theory solids with a GPC weight average molecular weight of about 4,500.
2) The above siloxane polyol resin (180 g) was mixed with 450.6 g of propylene glycol monomethyl ether and 25.8 g of boric acid, heated to reflux for 1 hour, and then distilled until about 300 g of distillate was collected. The result is a siloxane borate adhesion promoter resin with a measured weight solids of about 48% (110° C. for 1 hour), GPC weight average molecular weight of about 4,500, and percent water by weight of less than 0.5%.
[g]A colloidal silica dispersion as described in Example 2, footnote 4, in U.S. Pat. No. 9,120,916 B1
[h]A fumed silica dispersion consisting of 8% AEROSIL R812, a hydrophobic amorphous silica available from Evonik Industries (Essen, Germany), milled in a polymer consisting of 40% hydroxylpropyl acrylate, 20% styrene, 19% butyl acrylate, 18% butyl methacrylate, 2% acrylic acid, 0.5% methyl methacrylate in a solvent blend of 40% Aromatic 100 type and 60% methyl ether propylene glycol acetate available from Dow Chemical Company (Midland, MI) at 67% solids and about 8500 Mw. Additional methyl ether propylene glycol acetate is added for a total of 53%.
[i]Acrylic polyol as described in footnote 4 in US 2007/0244258 A
[j]Polyester polyol as described in Example A in US 2009/0062453 A
[k]Isostearic acid available from Croda Canada Ltd (Vaughan, Canada)
[l]An additive available from BYK USA Inc. (Wallingford, CT)
[m]A solvent available from Shell Chemical Company (Houston, TX)
[n]Dibutyl tin dilaurate available from Air Products and Chemicals (Allentown, PA)
[o]Xylene solvent available from Ashland Inc. (Wilmington, DE)
[p]A free polyisocyanate available from Covestro (Leverkusen, Germany)
[q]A free polyisocyanate available from Covestro (Leverkusen, Germany)
[r]A solvent free silicone surface additive available from BYK USA Inc. (Wallingford, CT)

Examples 1-3

Preparation of Light Gray B1 Coating Compositions

Light gray B1 coating compositions were prepared by mixing the components shown in Table 1.

TABLE 1

| | Normalized Parts by weight of Component | | |
|---|---|---|---|
| Components | Comparative Example 1 | Example 2 | Example 3 |
| Polymer Latex[1] | 35.87 | 34.09 | 33.36 |
| Adipic acid dihydrazide (ADH) | 0.41 | — | — |
| Polyhydrazide[2] | — | 6.35 | — |
| Polyhydrazide[3] | — | — | 7.98 |
| Polyester Resin[4] | 9.58 | 9.82 | 9.74 |

TABLE 1-continued

| Components | Normalized Parts by weight of Component | | |
|---|---|---|---|
| | Comparative Example 1 | Example 2 | Example 3 |
| BYK 348[5] | 0.09 | 0.09 | 0.09 |
| BYK 032[6] | 0.34 | 0.35 | 0.35 |
| TINUVIN 1130[7] | 0.52 | 0.53 | 0.52 |
| White Tint[8] | 44.72 | 40.09 | 39.74 |
| Yellow Tint[9] | 0.20 | 0.11 | 0.11 |
| Black Tint[10] | 0.38 | 0.16 | 0.16 |
| BYKETOL WS[11] | 2.23 | 2.29 | 2.27 |
| SURFYNOL 104E[12] | 2.28 | 2.34 | 2.32 |
| 50% DMEA[13] | 0.03 | 0.04 | 0.04 |
| DI Water | 1.37 | 1.71 | 1.30 |
| N-butoxypropanol[14] | 1.98 | 2.03 | 2.02 |
| Total | 100.00 | 100.00 | 100.00 |

[1]Latex having Keto Functional Core-Shell Particles prepared according to Example 3 of US 2020/0290086
[2]A polyhydrazide crosslinker was prepared as follows. Dipropylene glycol dimethyl ether (116.4 g, PROGLYDE DMM), dimethylol propionic acid (29.0 g), isophorone diisocyanate (80.0 g, IPDI), and IPDI isocyanurate trimer 70% in butyl acetate (260.1 g, DESMODUR Z 4470BA) were charged into a 1 L round-bottom flask equipped with a reflux condenser, thermocouple, and mechanical stirrer under nitrogen and heated to 75° C. Dibutyl tin dilaurate (0.88 g, DBTDL) was then added, and the batch exothermed to 105° C. The reaction mixture was held at 100° C. until an NCO equivalent weight of 475 was exceeded, as determined by potentiometric titration with standardized hydrochloric acid after the isocyanate has been reacted with dibutylamine to form a urea. The batch was then cooled to less than 45° C. and 90% of the batch was dispersed into an aqueous solution of deionized water (856.8 g), dimethylethanolamine (13.9 g), and adipic dihydrazide (165.9 g) in a 3 L flask at 35° C. at a rate which kept the temperature of the dispersion less than 50° C. The final dispersion was obtained with 30.5% solids and a pH of 7.13 at ambient temperature.
[3]A polyhydrazide crosslinker was prepared as follows. Dipropylene glycol dimethyl ether (83.5 g, PROGLYDE DMM), dimethylol propionic acid (21.7 g), isophorone diisocyanate (30.0 g, IPDI), and IPDI isocyanurate trimer 70% in butyl acetate (292.6 g, DESMODUR Z 4470BA) were charged into a 1 L round-bottom flask equipped with a reflux condenser, thermocouple, and mechanical stirrer under nitrogen and heated to 75° C. Dibutyl tin dilaurate (0.76 g, DBTDL) was then added, and the batch exothermed to 90° C. The reaction mixture was held at 100° C. until an NCO equivalent weight of 550 was exceeded. The batch was then cooled to less than 45° C. and 90% of the batch was dispersed into an aqueous solution of deionized water (892.3 g), dimethylethanolamine (13.0 g), and adipic dihydrazide (124.4 g) in a 3 L flask at 35° C. at a rate which kept the temperature of the dispersion less than 50° C. The final dispersion was obtained with 26.1% solids and a pH of 7.56 at ambient temperature.
[4]Polyester A1 from EP 1 454 971 A1
[5]Silicone surfactant commercially available from BYK Chemie (Wesel, Germany)
[6]Defoamer commercially available from BYK Chemie (Wesel, Germany)
[7]UV light absorber commercially available from BASF (Ludwigshafen, Germany)
[8]White tint paste consisting of 68% $TiO_2$ dispersed in 9% polyester polymer blend having a solids content of 78%. The polyester polymer is a copolymer of poly(tetrahydrofuran) with a number-average molecular weight of 650 g/mol and trimellitic anhydride, with a solids content of 36.5% by weight, acid value of 30 and number-average molecular weight of 3600 g/mol
[9]Yellow Tint paste consisting of 47% MAPICO Yellow 1050AG dispersed in 16% polyester polymer and having a solids content of 63%. The polyester polymer is as described in Footnote 8
[10]A black tint paste consisting of 14% Carbon Black Panther 100 (available from Orion Engineered Carbons (Kingwood, TX)) carbon black dispersed in 26% polyester polymer and having a solids content of 63%. The polyester polymer is as described in Footnote 8
[11]Silicone-free surface additive commercially available from BYK Chemie (Wesel, Germany)
[12]Surfactant available from Evonik (Essen, Germany)
[13]Dimethylethanolamine 50% aqueous solution
[14]Solvent commercially available from Dow Chemical Co. (Midland, MI)

Examples 4-6

Preparation of White B2 Coating Compositions

White B2 coating compositions were prepared by mixing the components shown in Table 2.

TABLE 2

| Components | Parts by Weight of Component | | |
|---|---|---|---|
| | Comparative Example 4 | Example 5 | Example 6 |
| Polymer Latex[1] | 44.14 | 41.80 | 40.61 |
| ADH | 0.50 | — | — |
| Polyhydrazide[2] | — | 7.80 | — |
| Polyhydrazide[3] | — | — | 9.76 |
| BYK 348[5] | 0.09 | 0.10 | 0.09 |
| BYK 032[6] | 0.37 | 0.38 | 0.37 |
| TINUVIN 1130[7] | 0.55 | 0.57 | 0.56 |
| White Tint[8] | 47.95 | 43.07 | 42.41 |
| Yellow Tint[9] | 0.21 | 0.11 | 0.11 |
| Black Tint[10] | 0.13 | 0.06 | 0.06 |
| BYKETOL WS[11] | 2.39 | 2.46 | 2.42 |
| SURFYNOL 104E[12] | 2.45 | 2.52 | 2.48 |
| 50% DMEA[13] | 0.02 | 0.05 | 0.04 |
| DI Water | 1.20 | 1.08 | 1.09 |
| Total | 100.00 | 100.00 | 100.00 |

For the coating compositions of Examples 1-6, the stoichiometric ratio of hydrazide to ketone was maintained at the ratio of 0.8:1.

The Light Gray B1 and White B2 were spray applied in an environment controlled to 70-75° F. (21° C.-24° C.) and 50-60% relative humidity onto 4 inch by 12 steel panels that were coated with PPG Electrocoat (ED 7400) commercially available from PPG Industries, Inc. (Pittsburgh, PA). The substrate panels were obtained from ACT Test Panels, LLC (Hillsdale, MI). The B1 was applied in one coat and then flashed at ambient temperature for 1.5 minutes. The film thickness was approximately 12-15 microns. The B2 was then applied wet-on-wet over the B1 in one coat and then flashed at ambient temperature for 5 minutes and then dehydrated for 5 minutes at 80° C. The B2 film thickness was approximately 12-15 microns.

After forming the B1B2 layers, the 2K isocyanate clearcoat of Example A was applied over the basecoated panels in two coats without a flash between coats. The clearcoated panels were allowed to flash for 10 minutes at ambient condition and baked for 30 minutes at 80° C. or 100° C. The film thickness was approximately 45-50 microns.

Humidity resistance properties were tested on the coated panels. Higher values of adhesion are desirable. No loss of adhesion and no blistering after humidity testing are also desirable. Results of the testing are shown in Table 3.

TABLE 3

| Description | 1 Day film hardness[14] | 10 Day film hardness[14] | Adhesion[15] | Adhesion after Humidity- 1 hr Recovery[16] | Adhesion after Humidity- 24 hr Recovery[16] | Blisters after Humidity[17] |
|---|---|---|---|---|---|---|
| White B1/B2 Comp. Examples 1/4 @ 80° C. | 46 | 105 | 5 | 0 | 4 | No |

TABLE 3-continued

| Description | 1 Day film hardness[14] | 10 Day film hardness[14] | Adhesion[15] | Adhesion after Humidity- 1 hr Recovery[16] | Adhesion after Humidity- 24 hr Recovery[16] | Blisters after Humidity[17] |
|---|---|---|---|---|---|---|
| White B1/B2 Comp. Examples 1/4 @ 100° C. | 97 | 120 | 5 | 4 | 5 | No |
| White B1/B2 Examples 2/5 @ 80° C. | 51 | 96 | 5 | 0 | 5 | No |
| White B1/B2 Examples 2/5 @ 100° C. | 88 | 107 | 5 | 5 | 5 | No |
| White B1/B2 Examples 3/6 @ 80° C. | 55 | 102 | 5 | 5 | 5 | No |
| White B1/B2 Examples 3/6 @ 100° C. | 95 | 110 | 5 | 5 | 5 | No |

[14] 1 and 10 day film hardness were measured according to ASTM E2546
[15] Adhesion test conducted according to ASTM D3359
[16] The adhesion after humidity test was performed by performing a 10 day humidity test similar to ASTM D2247 followed by adhesion testing according to ASTM D3359
[17] Blister after humidity were measured according to ASTM D714

The B1/B2 multi-layer systems of Examples 2/5 and 3/6 shows similar or improved 1 and/or 10 day hardness, and/or adhesion after humidity- 1 hr Recovery compared to Comparative Examples 1/4.

Example 7

Preparation of a Keto-Functional Acrylic

Step 1

A seed core particle latex was prepared as follows. Deionized (DI) water (1060 g) was first charged into a four-necked round bottom flask fitted with a thermocouple, mechanical stirrer, and condenser, and then heated up to 80° C. under an N₂ blanket. Once the temperature reached 80° C., a mixture of 3 g of ammonium persulfate and 36 g of DI water was charged into the flask and mixed for 15 minutes. Then, a pre-emulsion of 30 g of DI water, 5 g of DISPONIL FES 993 (an emulsifier, available from BASF (Ludwigshafen, Germany)) and 44 g of methyl methacrylate (MMA), was charged all at once into the flask and held at 80° C. for 30 minutes. After holding was completed, a pre-emulsion of 95 g of DI water, 1.05 g of MPEG 350 MA (methoxy polyethylene glycol (350) monomethacrylate), 3.15 g of DISPONIL A 1080 (a surfactant, available from BASF (Ludwigshafen, Germany)), 4.25 g of DISPONIL FES 993, 50.0 g of methacrylic acid (MAA), and 108 g of MMA, was charged into the flask over 3 hours. After the charge was completed, it was held at 80° C. for an additional 30 minutes before being cooled down to ambient temperature.

Step 2

The latex was prepared using the seed core particles produced in Step 1 as follows. DI water (520 g), AEROSOL A102 (27 g) (a surfactant, available from Solvay S.A (Brussels, Belgium)), ammonium hydroxide (28%) (4.5 g) and the seed core particle latex (53 g) were first charged into a four necked round bottom flask fitted with a thermocouple, mechanical stirrer, and condenser, and then heated up to 80° C. under an N₂ blanket. Once the temperature reached 80° C. a pre-emulsion of DI water (432 g), DISPONIL FES 32 IS (28 g) (a emulsifier, available from BASF (Ludwigshafen, Germany)), RHODAFAC RS610 A25 (34 g) (a clear liquid anionic ammonium phosphate, polyoxyethylene tridecyl ether, available from Solvay S.A (Brussels, Belgium)), MPEG 350 MA (11.8 g), MAA (11.9 g), tertiary dodecyl mercaptan (1.8 g), butyl acrylate (567 g), diacetone acrylamide (116 g), and MMA (468 g) was charged over 180 minutes into the flask at the same time a mixture of 3.9 g of ammonium persulfate and 97.8.0 g of DI water was charged into the flask over 180 minutes. At 120 minutes a solution of DI Water (501 g) and VISOMER MEEU 50w (47.5 g) (an N-(2-Methacryloyloxyethyl) ethylene urea (50% in water), available from Evonik (Essen, Germany)) was added to the pre-emulsion. The latex was held for 10 minutes at 80° C. The latex was cooled down to 65° C. and a mixture of 1.3 g of t-butyl hydroperoxide (70%) and 6.5 g of DI water was charged into the flask all at once. A mixture of 1.3 g of ascorbic acid and 22.8 g of DI water was then charged over 10 minutes. After the charge was completed the latex was then cooled to ambient temperature.

Examples 8-10

Preparation of Polyhydrazide Crosslinkers

Example 8

PROGLYDE DMM (178.6 g), dimethylolpropionic acid (30.1 g), a cyclic-substituted polyester polyol (synthesized by condensing by weight 36.99% neopentyl glycol hydroxy pivalate, 16.26% 2-methyl-1,3-propanediol, 46.74% 1,4-cyclohexanedicarboxylic acid at 220° C.) (66.1 g), and isophorone diisocyanate (196.6 g) was added to a first reaction vessel equipped with a reflux condenser and nitrogen blanket and heated to 70° C. At 70° C., dibutyltin dilaurate (1.44 g) was added to the reaction and after peak exotherm, the reaction was held at 90° C. for 1 hour. Deionized water (936.6 g), dimethylethanolamine (18 g), and adipic dihydrazide (187.5 g) were added to a second reaction vessel equipped with a reflux condenser and nitrogen blanket and heated to 35° C. Ninety percent of the first mixture was added into the second vessel slowly to maintain a temperature lower than 45° C. The reaction was the held for 1 hour and the resin was poured out. The resulting product had a solids content of 30.9 wt %, as measured herein by comparing initial sample weights to sample weights after exposure to 110° C. for 1 hour.

Example 9

PROGLYDE DMM (178.6 g), dimethylolpropionic acid (30.1 g), a cyclic-substituted polyester polyol (synthesized by condensing by weight 36.99% neopentyl glycol hydroxy pivalate, 16.26% 2-methyl-1,3-propanediol, 46.74% 1,4-cyclohexanedicarboxylic acid at 220° C.) (79.4 g), isophorone diisocyanate (159.9 g), and DESMODUR Z 4470 BA (120.9 g) was added to a first reaction vessel equipped with a reflux condenser and nitrogen blanket and heated to 70° C. At 70° C., dibutyltin dilaurate (1.44 g) was added to the reaction and after peak exotherm, the reaction was held at 90° C. for 1 hour. PROGLYDE DMM (50 g) was added to reduce the viscosity. Deionized water (1029.2 g), dimethylethanolamine (18 g), and adipic dihydrazide (187.5 g) were added to a second reaction vessel equipped with a reflux condenser and nitrogen blanket and heated to 35° C. Ninety percent of the first mixture was added into the second vessel slowly to maintain a temperature lower than 45° C. The reaction was the held for 1 hour and the resin was poured out. The resulting product had a solids content of 30.6 wt %.

Example 10

PROGLYDE DMM (173.2 g), dimethylolpropionic acid (40.9 g), a cyclic-substituted polyester polyol (synthesized by condensing by weight 36.99% neopentyl glycol hydroxy pivalate, 16.26% 2-methyl-1,3-propanediol, 46.74% 1,4-cyclohexanedicarboxylic acid at 220° C.) (94.7 g), isophorone diisocyanate (120 g), and DESMODUR Z 4470 BA (244.8 g) was added to a first reaction vessel equipped with a reflux condenser and nitrogen blanket and heated to 70° C. At 70° C., dibutyltin dilaurate (0.81 g) was added to the reaction and after peak exotherm, the reaction was held at 90° C. for 1 hour. PROGLYDE DMM (50 g) was added to reduce the viscosity. Deionized water (1100.9 g), dimethylethanolamine (24.4 g), and adipic dihydrazide (158.1 g) were added to a second reaction vessel equipped with a reflux condenser and nitrogen blanket and heated to 35° C. Ninety percent of the first mixture was added into the second vessel slowly to maintain a temperature lower than 45° C. The reaction was the held for 1 hour and the resin was poured out. The resulting product had a solids content of 29.6 wt %.

Examples 11-15

Preparation of Coating Compositions

Base Formula A

Coating compositions were prepared according to the Base Formulation in Table 4 with different resin blends, keeping the total resin solids a constant 21.5% by weight. The grind ingredients were mixed using a high-speed Cowles disperser at sufficient speed to create a vortex where the blade meets the paint. After addition of the matting agent, the grind process resumed for 20 minutes, followed by adding the letdown ingredients using a conventional lab mixer and mixing for 30 minutes after the last addition.

TABLE 4

| Item | Amount (g) |
|---|---|
| Grind | |
| WATER | 100 |
| PANGEL S9[18] | 3 |
| TYLOSE HX 6000[19] | 2 |
| DREWPLUS T-4507[20] | 2 |
| TAMOL 731A[21] | 5 |
| ZETASPERSE 179[22] | 6 |
| MINEX 4[23] | 92 |
| Letdown | |
| WATER | 71 |
| ACRYSOL RM-2020 NPR[24] | 17 |
| TRONOX CR-826S[25] | 387 |
| DREWPLUS T-4507[20] | 8 |
| OPTIFILM ENHANCER 400[26] | 15 |
| ACTICIDE MBS[27] | 1.2 |

[18]Magnesium silicate rheology modifier, available from The Carey Company (Addison, IL)
[19]Hydroxyethylcellulose rheology modifier, available from SETylose USA (Plaquemine, LA)
[20]Mineral oil defoamer, available from Ashland (Columbus, OH)
[21]Dispersant, available from The Dow Chemical Company (Midland, MI)
[22]Nonionic surfactant, available from Evonik Industries AG (Essen, Germany)
[23]Aluminum silicate matting agent, available from The Cary Company (Addison, IL)
[24]Hydrophobically modified ethylene oxide urethane rheology modifier, available from The Dow Chemical Company (Midland, MI)
[25]Rutile titanium dioxide slurry, available from Tronox Limited (Stamford, CT)
[26]Coalescent, available from The Eastman Chemical Company (Kingsport, TN)
[27]Biocide, available from Thor Specialties, Inc. (Shelton, CT)

Coating Compositions

Base Formula A and the following resin blends (keto functional acrylic and polyhydrazide crosslinker) were mixed as shown in Table 5 to form coating compositions. Resin blends were determined by keeping a 0.8:1.0 Hydrazide:DAAM (diacetone acrylamide) ratio based on equivalent weight. Comparative Example 15 had no crosslinker and was used as a control. Comparative Example 14 used adipic acid dihydrazide as the crosslinker instead of one of the polyhydrazide crosslinkers of the present invention. Amounts in Table 5 are shown in grams.

TABLE 5

| Component | Example 11 | Example 12 | Example 13 | Comp. Example 14 | Comp. Example 15 |
|---|---|---|---|---|---|
| Base Formulation A | 709.2 | 709.2 | 709.2 | 709.2 | 709.2 |
| Keto-Functional Acrylic of Example 7 | 482.9 | 476.95 | 455.82 | 554.98 | 578.38 |
| Hydrazide Crosslinker of Example 8 | 153.72 | — | — | — | — |
| Hydrazide Crosslinker of Example 9 | — | 169.64 | — | — | — |
| Hydrazide Crosslinker of Example 10 | — | — | 207.93 | — | — |
| Adipic Acid Dihydrazide | — | — | — | 14.8 | — |

The coating compositions of Examples 11-15 were tested for gloss (60° and 85°), stain resistance, and scrub resistance, which results are shown in Table 7 below.

Gloss was measured using a BYK micro-TRI-gloss gloss meter.

Stain resistance was measured according to the Stain Resistance Test Method. The Stain Resistance Test Method is a more challenging, modified version of ASTM D4828 to target stain removal using fewer scrub cycles. Films were prepared by drawing down the coating composition onto black Leneta scrub panels (Form P121-10N) using a 7-mil horseshoe drawdown bar. The films were dried at ambient laboratory conditions for 7 days before stain application. Before applying stains, color was measured of the unstained coated panel using a Datacolor 850 spectrophotometer using 9 mm size aperture. The following stains were applied to the paint films via one-inch strips of filter paper saturated with the following fluids: red wine (Holland House red cooking wine), grape juice (Welch's grape juice), java concentrate (Pur Java concentrate—Honduran Dark Roast), and hot coffee (Kirkland Signature 100% Colombian (Dark Roast—fine grind)) (70° C.). The following stains were directly applied to the paint films: mustard (French's mustard), red lipstick (CoverGirl 305 "Hot" lipstick), green crayon (Crayola), graphite powder (Alfa Aesar graphite—99.9% pure), and Leneta staining medium (ST-1). After 30 minutes, the lipstick and Leneta medium were wiped off, and the paint films were rinsed and placed in a washability machine (Gardner Abrasion Tester). A damp cellulosic sponge containing 10 g of water and 6 g of SOFT SCRUB (cleanser, Henkel Corporation (Düsseldorf, Germany)) was placed in a 1000 g holder, and the panels were scrubbed for 6 cycles. After rinsing the panels and drying for at least 2 hours, color was again measured for the coated panels using the spectrophotometer so that a ΔE color change for each coated panel could be obtained. Each of the 9 stains was rated on an integer scale of 0 for no stain removal to 10 for complete stain removal based on the measured ΔE color change of the coated panel using the following Table 6:

TABLE 6

Delta E Color Change

| Rating | Red Wine | Grape Juice | Java Concentrate | Hot Coffee | Mustard | Lipstick | Green Crayon | Graphite | Lenata Oil |
|---|---|---|---|---|---|---|---|---|---|
| 0 | >6.30 | >6.00 | >4.00 | >6.00 | >25.00 | >32.00 | >12.20 | >26.50 | >22.00 |
| 1 | 5.69-6.30 | 5.07-6.00 | 3.62-4.00 | 5.33-6.00 | 22.29-25.00 | 27.32-32.00 | 10.91-12.20 | 22.01-26.50 | 18.51-22.00 |
| 2 | 5.11-5.68 | 4.50-5.06 | 3.23-3.61 | 4.73-5.32 | 19.58-22.28 | 22.63-27.31 | 9.61-10.90 | 17.68-22.00 | 16.01-18.50 |
| 3 | 4.53-5.10 | 3.93-4.49 | 2.84-3.22 | 4.12-4.72 | 16.85-19.57 | 18.01-22.62 | 8.31-9.60 | 14.96-17.67 | 13.50-16.00 |
| 4 | 3.39-4.52 | 3.36-3.92 | 2.45-2.83 | 3.52-4.11 | 12.24-16.84 | 14.51-18.00 | 7.01-8.30 | 12.24-14.95 | 11.01-13.49 |
| 5 | 2.81-3.38 | 2.79-3.35 | 2.07-2.44 | 2.92-3.51 | 9.52-12.23 | 11.01-14.50 | 5.70-7.00 | 9.52-12.23 | 8.51-11.00 |
| 6 | 2.23-2.80 | 2.22-2.78 | 1.68-2.06 | 2.32-2.91 | 6.80-9.51 | 7.51-11.00 | 4.41-5.69 | 6.80-9.51 | 6.01-8.50 |
| 7 | 1.66-2.22 | 1.65-2.21 | 1.29-1.67 | 1.71-2.31 | 4.25-6.79 | 4.51-7.50 | 3.11-4.40 | 4.25-6.79 | 3.81-6.00 |
| 8 | 1.09-1.65 | 1.08-1.64 | 0.90-1.28 | 1.11-1.70 | 1.91-4.24 | 1.91-4.50 | 1.81-3.10 | 1.91-4.24 | 1.91-3.80 |
| 9 | 0.50-1.08 | 0.50-1.07 | 0.50-0.89 | 0.51-1.10 | 0.57-1.90 | 0.51-1.90 | 0.51-1.80 | 0.51-1.90 | 0.51-1.90 |
| 10 | <0.50 | <0.50 | <0.50 | <0.50 | <0.56 | <0.50 | <0.50 | <0.50 | <0.50 |

A stain rating ranging from 0 to 90 was obtained by summing the rating for each individual stain.

Scrub resistance was measured according to ASTM D2486-06 Standard Test Methods for Scrub Resistance of Wall Paints using a BYK Gardner Scrub Machine.

TABLE 7

| | Gloss | | Stain Resistance | Scrub Resistance |
|---|---|---|---|---|
| Formula | 60° | 85° | Total = 90 | (Raw Cycles) |
| Example 11 | 5.8 | 10.2 | 54 | 1405 |
| Example 12 | 5.8 | 11.0 | 52 | 2023 |

TABLE 7-continued

| | Gloss | | Stain Resistance | Scrub Resistance |
|---|---|---|---|---|
| Formula | 60° | 85° | Total = 90 | (Raw Cycles) |
| Example 13 | 5.3 | 9.4 | 54 | 1460 |
| Comp. Example 14 | 6.4 | 11.3 | 40 | 2400 |
| Comp. Example 15 | 5.8 | 8.0 | 41 | 1151 |

As is clear from results in Table 7, using the polyhydrazide crosslinker in the formula in Example 11-13 leads to a significant improvement in stain resistance compared to using adipic acid dihydrazide (ADH) or by having no crosslinker. It is also clear that good scrub resistance is obtained in Examples 11-13, and adding an increased level of branching by adding trifunctional isocyanate in the prepolymer (Example 12) leads to a substantial increase in the scrub resistance in addition to the excellent stain resistance results. It should be noted that the ADH alone leads to a good scrub resistance, but it does not give a combination of good scrub resistance and stain resistance.

Whereas particular embodiments of this invention have been described above for purposes of illustration, it will be evident to those skilled in the art that numerous variations of the details of the present invention may be made without departing from the invention as defined in the appended claims.

The invention claimed is:

1. A crosslinker composition prepared from a reaction mixture comprising:
   (a) a prepolymer comprising a reaction product of a prepolymer mixture comprising:
      (i) a polyfunctional isocyanate; and
      (ii) a first compound comprising two or more active hydrogen groups; and
   (b) a polyfunctional hydrazide,
      wherein the crosslinker composition is not self-crosslinkable,
      wherein the crosslinker composition has an acid value of at least 15 based on total resin solids of the crosslinker composition;

wherein the crosslinker composition comprises a hydrazide equivalent weight of from 200 to 3,000, based on the total resin solids content of the crosslinker composition.

2. The crosslinker composition of claim 1, wherein the first compound comprising two or more active hydrogen groups comprises an acid group.

3. The crosslinker composition of claim 1, wherein the first compound comprising two or more active hydrogen groups comprises greater than two active hydrogen functional groups.

4. The crosslinker composition of claim 1, wherein the first compound comprising two or more active hydrogen groups comprises dimethylol propionic acid and/or an acid derived from trimellitic anhydride.

5. The crosslinker composition of claim 1, wherein the prepolymer mixture further comprises (iii) a compound comprising an acid group, wherein the compound comprising the acid group is different from (i) and (ii).

6. The crosslinker composition of claim 1, wherein the prepolymer comprises isocyanate functionality greater than two.

7. The crosslinker composition of claim 1, wherein:
the polyfunctional isocyanate comprises greater than two isocyanate functional groups; and
the first compound comprising two or more active hydrogen groups comprises an acid group.

8. The crosslinker composition of claim 1, wherein:
the first compound comprising two or more active hydrogen groups comprises greater than two active hydrogen groups; and
the prepolymer mixture further comprises (iii) a second compound comprising two or more active hydrogen groups comprising an acid group.

9. The crosslinker composition of claim 1, wherein:
the polyfunctional isocyanate comprises greater than two isocyanate functional groups;
the first compound comprising two or more active hydrogen groups comprises dimethylol propionic acid, and
wherein the crosslinker composition comprises a hydrazide equivalent weight of up to 1,000, based on the total resin solids content of the crosslinker composition.

10. The crosslinker composition of claim 1, wherein the first compound comprising two or more active hydrogen groups comprises a polyol comprising a polyester polyol, a polyether polyol, polycarbonate polyol, and/or a silicone-containing polyol.

11. The crosslinker composition of claim 1, wherein the first compound comprising two or more active hydrogen groups comprises a cyclic-substituted polyester polyol.

12. The crosslinker composition of claim 1, wherein the reaction mixture further comprises water and/or a neutralizing amine.

13. The crosslinker composition of claim 1, wherein the reaction mixture and/or the prepolymer mixture are substantially free of vinyl unsaturation and/or an epoxy.

14. The crosslinker composition of claim 1, wherein the crosslinker composition has a weight average molecular weight of from 30,000 to 500,000 g/mol.

15. The crosslinker composition of claim 1, wherein the first compound comprising two or more active hydrogen groups comprises a polyol.

16. The crosslinker composition of claim 1, wherein the crosslinker composition comprises greater than two hydrazide groups.

17. The crosslinker composition of claim 1, wherein the crosslinker composition is substantially free of a keto and/or aldo-functional group.

18. A coating composition, comprising:
the crosslinker composition according to claim 1; and
a polymer reactive with the crosslinker composition, wherein the polymer comprises a carbonyl-functional group.

19. The coating composition of claim 18, further comprising a polyester polymer obtained from components comprising polytetrahydrofuran and a carboxylic acid or anhydride thereof.

20. The coating composition of claim 18, wherein the coating composition comprises a waterborne coating composition.

21. The coating composition of claim 18, wherein the coating composition comprises a pH of greater than 7 at ambient temperature.

22. The crosslinker composition of claim 1, wherein the polyfunctional isocyanate and/or the first compound comprising two or more active hydrogen groups comprises greater than two functional isocyanate and/or active hydrogen groups, respectively.

* * * * *